United States Patent [19]
Bonstein

[11] Patent Number: 5,014,411
[45] Date of Patent: May 14, 1991

[54] METHOD OF FORMING A LOCKING NUT AND LOCKED THREADED CONNECTION

[75] Inventor: James L. Bonstein, Long Beach, Calif.

[73] Assignee: Deutsch Fastener Corporation, Lakewood, Calif.

[21] Appl. No.: 362,032

[22] Filed: Jun. 1, 1989

[51] Int. Cl.[5] .................... B23P 19/06; B21D 39/00; B21D 53/24

[52] U.S. Cl. .................... 29/525.1; 10/86 A; 10/155 R

[58] Field of Search ............. 10/86 A, 141 R, 155 R; 29/240, 525, 525.1; 408/215, 217, 219, 220, 222; 411/276, 277, 937.1, 436

[56] References Cited

U.S. PATENT DOCUMENTS

| | | | |
|---|---|---|---|
| 226,450 | 4/1880 | Ibbotson et al. | 411/308 |
| 426,185 | 4/1890 | Ibbotson | 411/277 |
| 637,718 | 11/1899 | Duncan | 408/222 |
| 662,064 | 11/1900 | Ehmke | 408/222 X |
| 1,174,294 | 3/1916 | Sharp | 411/937.1 X |
| 1,210,508 | 1/1917 | Marye | 411/276 X |
| 1,522,565 | 1/1925 | Whitman | 411/937.1 X |
| 1,826,323 | 10/1931 | Mueller | 408/219 |
| 2,255,384 | 9/1941 | Hood | 411/277 |
| 2,388,467 | 11/1945 | Cole | 411/277 X |
| 2,437,751 | 3/1948 | Mitchell | 411/938 X |
| 3,238,987 | 3/1966 | McCartney et al. | 411/937.1 X |
| 3,587,701 | 6/1971 | Gold | 411/937.1 X |
| 4,133,066 | 1/1979 | Kamiya | 10/86 A |
| 4,181,457 | 1/1980 | Holmes | 408/217 |
| 4,381,163 | 4/1983 | Witte et al. | 411/311 |
| 4,472,095 | 9/1984 | Molina | 10/86 A X |

FOREIGN PATENT DOCUMENTS

| | | | |
|---|---|---|---|
| 40761 | 5/1932 | France | 411/285 |
| 523922 | 4/1955 | Italy | 10/141 R |
| 4271 | 12/1874 | United Kingdom | 10/141 R |
| 9471 | 7/1886 | United Kingdom | 411/276 |

*Primary Examiner*—E. Michael Combs
*Attorney, Agent, or Firm*—Pretty, Schroeder, Brueggemann & Clark

[57] ABSTRACT

A locking nut is provided by forming a straight cylindrical bore through a body, forming a tap with uniform teeth, the tips of which taper at a shallow angle toward one end of the tap, and tapping said bore with said tap so as to produce a thread having a pitch diameter and a root diameter which taper from one of the thread to the other, and a crest which is of constant diameter and increasingly truncated from one end to the other, said thread at said one end having substantially a full profile.

5 Claims, 2 Drawing Sheets

METHOD OF FORMING A LOCKING NUT AND LOCKED THREADED CONNECTION

BACKGROUND OF THE INVENTION

A chronic problem for threaded fasteners is the tendency of the connection to loosen under vibration. One approach to a locking fastener for the aerospace industry has been to provide slots at one end of a nut and crimp the nut inwardly at that location so as to form an interference when a bolt enters. The bolt then deflects the slotted part of the nut outwardly as it enters, and these sections of the nut act as resiliently deflected beams which bear inwardly against the surface of the bolt to create a locking effect. Another type of locking nut has an end portion that is uninterrupted but has a relatively thin wall which is deflected to an out-of-round configuration. Entrance of the bolt into the nut the tends to deflect the thin walled part back toward a circular shape s that this portion of the nut exerts a resilient force against the bolt to prevent loosening under vibration.

Locking fasteners of these types have certain disadvantages. One is that the amount of inward deflection of the end of the nut cannot be controlled with precision. When an end part of the nut is crimped inwardly, some spring back will occur so that the exact configuration of the nut end cannot be established. In addition, nuts of this type can be reused only a limited number of times, because when deflected toward a cylindrical shape a number of times they tend to assume a cylindrical shape and lose their ability to lock against the thread of the bolt. Furthermore, nuts of this type may cause galling of the threads when the bolt and nut are mated.

Consequently, there has existed a need for an effective and trouble free locking nut.

SUMMARY OF THE INVENTION

The present invention provides an improved locking nut overcoming the difficulties of the prior art. The nut of this invention does not rely upon a resilient beam effect and does not require crimping of the end of the nut. Instead, it provides for a controlled interference between the thread of the bolt and the nut, giving uniform results, repeatability and avoiding damage to the threads.

The blank used in forming the nut of this invention has no slotted or thin walled portion, hence being essentially undeflectable throughout its length. A straight, cylindrical bore is formed through the nut. The thread in the nut is cut by a special tap, which has teeth of the full thread dimension set on a shallow taper, typically, an included angle of 1° to 2°. This is much less taper than that of conventional pipe threads, for example. The tap is extended through the bore a predetermined distance, and then backed out rather than extended further as in conventional tapping. The thread cut in the nut has a pitch diameter and a root diameter on the same taper as the tap, that is, at an included angle of around 1° to 2°. The crest of the thread, however, is a constant diameter from one end to the other. Because the tap is tapered, it creates the root of the thread with a full dimension but the crest becomes increasingly truncated from one end to the other. At the entrance, however, both the crest and the root of the thread are of substantially full dimension.

When the bolt then enters the nut it can thread inwardly without difficulty at the entrance because of the full thread at that location. However, the bolt thread soon begins to interfere with the thread in the nut a the bolt progresses through the nut. The interference may be controlled so that the torque required to mate the nut with the bolt falls within a specified range.

The interference between the thread of the bolt and the nut creates only hoop stress in the nut, and no beam type deflection. The locking effect is predictable and will in all instances prevent the loosening of the connection due to vibration. Inasmuch as the nut has no conventional deflected elements, the amount of interference is known within a narrow range of tolerances. The threaded connection can be mated and unmated many times without loss of effectiveness. The threads will not become galled as the nut is used. Moreover, the nut of this invention can be produced with fewer operations and thus at a lower cost than that for production of conventional locknuts.

DETAILED DESCRIPTION OF THE INVENTION

Figure 1:
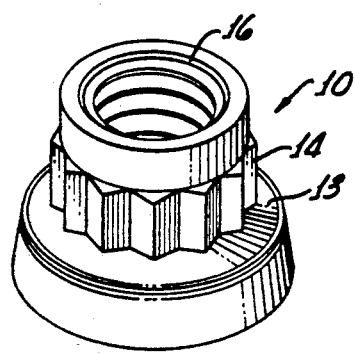
FIG. 1, is a perspective view of a locking nut.
Figure 2:
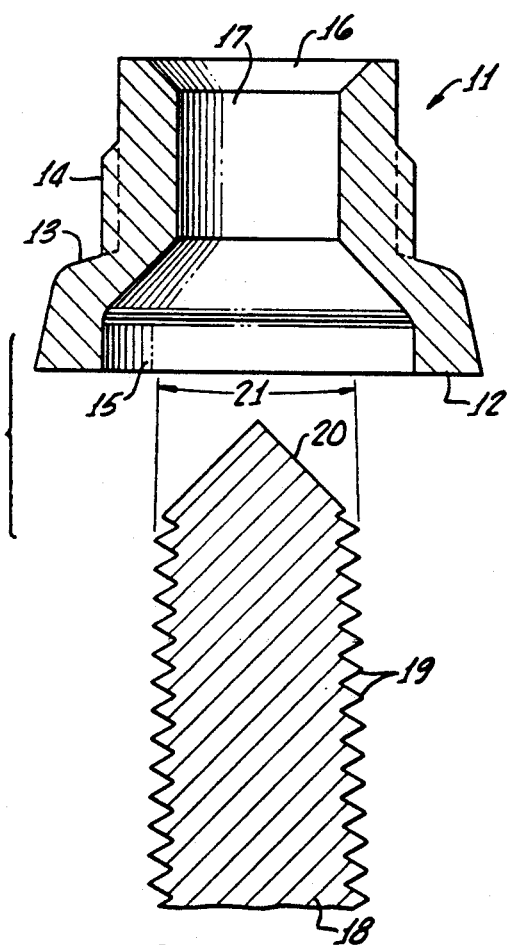
FIG. 2, is a longitudinal sectional view of the blank for forming the nut and the tap to produce the thread.
Figure 3:
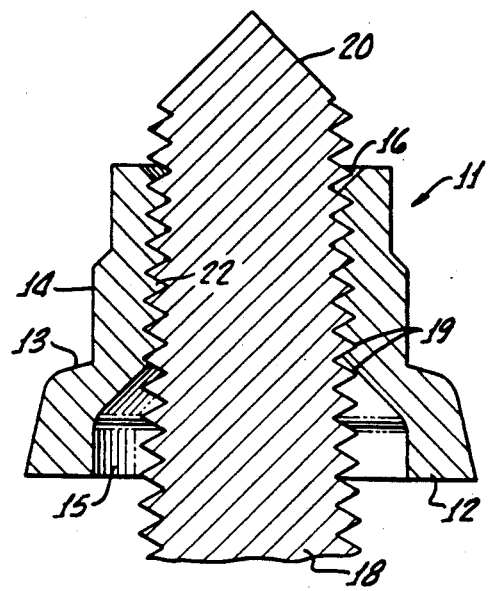
FIG. 3 is a view similar to FIG. 2, but with the tap inserted into the nut blank.
Figure 4:
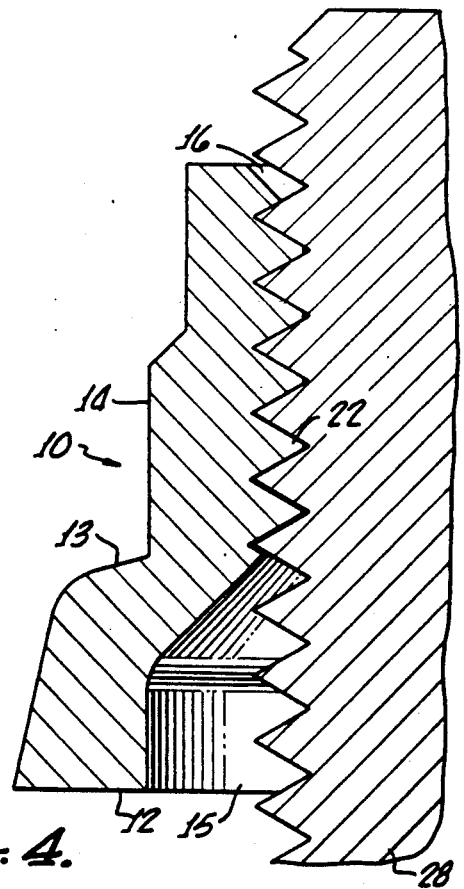
FIG. 4 is a fragmentary longitudinal sectional view of the nut mated with a bolt.

In producing the locking nut 10 there is first formed a nut blank 11 shown in FIG. 2. The latter element includes a flat base 12 of relatively large diameter upon which it is adapted to be seated. The base 12 connects through an inclined exterior surface 13 to an exterior section 14 which is straight longitudinally and provided with wrenching surfaces of conventional configuration. The nut blank 12 is of continuous wall and generally rigid and undeflectable throughout its length. Interiorly, the bore of the nut blank 11 includes an enlarged entrance portion 15 extending inwardly from the base 12 and forming a counterbore. Beyond the entrance portion 15 to the beveled outer end 16, the bore 17 is defined by a right cylinder.

Threads are cut in the bore 17 by means of a tap 18, shown in FIG. 2, formed with cutting teeth 19, which are of the normal full dimension for producing a standard thread. The cutting teeth 19 are positioned so as to be at a shallow taper toward the outer end 20 of the tap. This means that the tips of the teeth 19 converge toward the outer end 20, preferably at an included angle 21 of from 1° to 2°. For smaller sizes, the included angle 21 is closer to 1°, and the 2° taper is approached for larger sizes.

The tap 18 is rotated and advanced into the bore 17 of the nut blank 11 from the entrance 15, which it clears. The advancement of the tap 18 is controlled so that it is moved axially relative to the nut blank 11 a predetermined distance, after which its rotation is reversed and it is withdrawn. As a result, the thread 22 illustrated in FIG. 5, where it is greatly enlarged, is produced. The pitch diameter 23 of this thread tapers at an included angle of 1° to 2°, or a half angle 24 of 0.5° to 1.0°, from the entrance to the thread to its outer end 16. The diameter of the root 25 of the thread tapers similarly toward the outer end 16. Therefore, the flanks 26 of the thread move closer to the longitudinal axis from the entrance 15 to the outer end 16. However, the crest 27 of the thread has a constant diameter.

Figure 5:
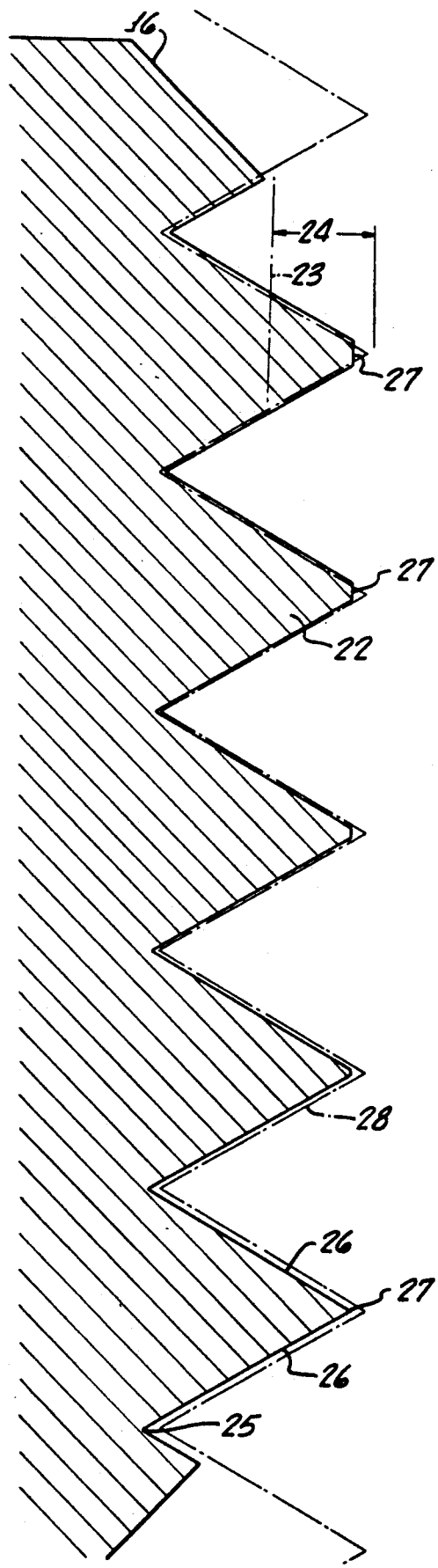
FIG. 5 is a greatly enlarged fragmentary sectional view of the thread of the locking nut.

The thread 22 produced in this manner has the full thread profile of a standard thread, or close to it, adjacent the entrance 15 to the thread. The crest 27, however, is truncated from this location to the outer end 16. The truncation of the thread increases progressively toward the outer end 16. The taper thus produced should be such that a standard go gauge can enter the thread for at least ¾ of a revolution. As the greatly enlarged view, FIG. 5, depicts, the change in the thread from one end to the other is slight because of the shallow taper of the tap. Nevertheless, it is sufficient to produce a locking effect.

The nut 10 then is complete and is ready to mate with a standard bolt 28 which has a constant pitch diameter. The bolt 28 enters the thread 22 freely because of the substantially full depth of the thread at its entrance end. However, as the bolt approaches the outer end 16, an interference is created between the bolt thread and the nut thread. This interference, indicated by the phantom line in FIG. 5, effectively prevents loosening from vibration.

The interference can be established with precision so that the amount of torque necessary to thread the bolt through the nut falls within a predetermined range. For example, for a ⅜-24 nut, the torque range specified in the aerospace industry is 9½ to 40 inch-pounds. Although difficult to achieve in the production of conventional locknuts, there is no problem in meeting this torque requirement consistently with the locknut of this invention. This result is obtained by the taper of the tap 18 and by control of the axial travel of the tap into the bore as the thread 22 is formed.

This arrangement provides a controlled and accurate interference between the bolt and the nut so that they many be made consistently to lock together and resist loosening from vibration. Results are uniform and repeatable through may cycles of mating the bolt and the nut, yet galling of the threads is avoided.

In larger sizes, the nut may be provided with a short entrance portion of constant pitch diameter, beyond which is the tapered section of the thread.

The foregoing detailed description is to be clearly understood as given by way of illustration and example only, the spirit and scope of this invention being limited solely by the appended claims.

What is claimed is:

1. The method of forming a locked threaded connection comprising the steps of
    forming a substantially rigid unbendable body,
    forming an opening in said body in the shape of a right cylinder,
    then forming a thread in said opening which has substantially a full profile at a location adjacent one end of said opening and has a pitch diameter which tapers from said location toward opposite end of said opening at an included angle of from substantially 1° to 2°,
        with the crest of said thread being of constant diameter and being truncated increasingly from said location to adjacent said opposite end of said opening,
    forming an externally threaded member of constant pitch diameter, and
    threading together said body and said externally threaded member,
        said threads in said body and on said externally threaded member being formed so as to have relatively free relative rotation at said location to permit the start of a threaded connection, and interference adjacent said opposite end without substantially bending said body so as to create a locking effect resistant to vibration.

2. The method as recited in claim 1, in which said body and said externally threaded member are made to have such interference so as to require a torque for threading said body and said externally threaded member together that falls within a predetermined range.

3. The method of forming a locked threaded connection comprising the steps of
    forming a substantially rigid unbendable body,
    forming an opening in said body in the shape of a right cylinder,
    forming a tap having teeth of uniform profile positioned so as to taper toward one end of said tap at an included angle of from about 1° to about 2°,
    extending said one end of said tap into one end of said opening and advancing said tap a predetermined distance relative to said body so as to cut a thread in said opening having a pitch diameter which tapers toward the opposite end of said opening at an included angle of from about 1° to about 2°,
    then removing said tap,
    forming an externally threaded member of constant predetermined pitch diameter, and then
    threading together said body and said externally threaded member,
        said predetermined distance of advancement of said tap relative to said body being such that there is relatively free relative rotation of said body and said externally threaded member at said one end of said opening to permit the start of a threaded connection and interference inwardly of said one end so that it requires a torque within a predetermined range to relatively advance said externally threaded member through said opening.

4. The method of forming a locking nut comprising the steps of:
    forming a substantially rigid unbendable body,
    forming an opening through said body,
        said opening being made to the shape of a right cylinder,
    forming a tap having teeth of uniform profile, the tips of which taper toward one end of said tap at an included angle of from substantially 1° to 2°,
    extending said one end of said tap into said opening and advancing said tap a predetermined distance relative to said body so as to cut a thread in said opening having a pitch diameter which tapers toward one end of said opening at an included angle of substantially 1° to 2°,
        with said thread being of substantially full dimension, except at the crest thereof, said crest of said thread being increasingly truncated toward said one end of said opening from the opposite end of said opening, and with said crest of said thread having a constant diameter, and
    then removing said tap from said opening.

5. The method as recited in claim 4, in which said opening is so formed so as to include a portion made to the shape of a right cylinder, and an enlarged entry portion at said opposite end thereof, said enlarged entry being made to a greater diameter than said tap so that said enlarged entry remains unthreaded.

* * * * *